March 28, 1972      A. H. ROBERTS      3,652,748

PROCESS FOR PREPARING MOLDED HOLLOW ARTICLES

Filed Sept. 18, 1968      2 Sheets-Sheet 1

INVENTOR.
ARTHUR H. ROBERTS

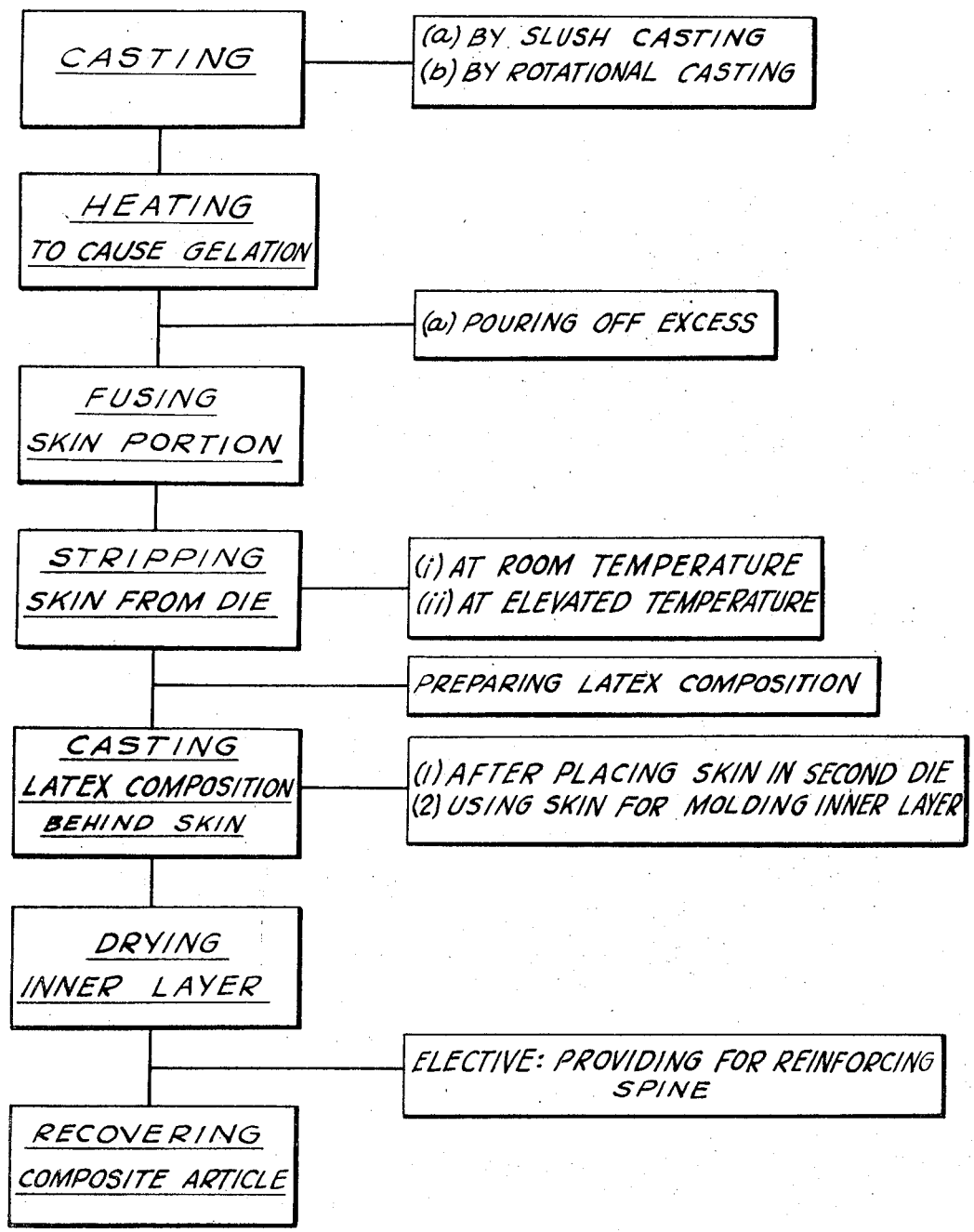

_United States Patent Office_

3,652,748
Patented Mar. 28, 1972

3,652,748
PROCESS FOR PREPARING MOLDED HOLLOW ARTICLES
Arthur H. Roberts, 12 Lynwood, Drive, Westbury, N.Y. 11590
Continuation-in-part of application Ser. No. 475,989, July 30, 1965, which is a continuation-in-part of applications Ser. No. 455,764, May 14, 1965, and Ser. No. 22,002, Apr. 13, 1960. This application Sept. 18, 1968, Ser. No. 774,230
The portion of the term of the patent subsequent to Oct. 7, 1985, has been disclaimed
Int. Cl. B29c 13/04
U.S. Cl. 264—45
9 Claims

ABSTRACT OF THE DISCLOSURE

Process for preparing rigid, three-dimensional, hollow article comprising an outer layer component and an inner layer component. The article is formed by preparing separately (1) a premolded skin from a pliable plastic material and (2) a filler-containing latex composition. The latex composition is cast behind the premolded skin, is dried and the article is recovered.

RELATED APPLICATIONS

This application is a continuation-in-part of application Ser. No. 475,989 (now Pat. No. 3,414,456), filed July 30, 1965, which, in turn, is a continuation-in-part of applications Ser. Nos. 455,764, filed May 14, 1965, now Pat. No. 3,405,026, and 22,002 filed Apr. 13, 1960. Application No. 22,002 has been abandoned.

This invention relates to a process for preparing novel, rigid, impact resistant articles and to methods and means of their manufacture. The articles are of varying sizes, may have more or less intricate shapes and may have "undercuts." Similar articles in the prior art were made predominantly of ceramic or plaster materials. These prior art articles of manufacture have the disadvantages that they are extremely fragile, chip easily and have extremely low impact strength. To these disadvantages must also be added the disadvantage that they are uneconomical in that much hand finishing is required on the seam lines caused by the mold seams.

Alternatively, prior art has also utilized various casting processes for manufacturing seamless hollow articles out of plastisol and the like. The resulting product is quite attractive and can be decorated as easily as plaster, and in fact more easily than ceramics. The plastisol article so cast will not chip and is almost unbreakable. Also, if the die is seamless, a seamless product can be obtained. The use of plastisol, however, is very uneconomical since the material is expensive. Also, plastisol has a defect called "cold flow," which brings about a warpage at sub-tropical temperatures or in the vicinity of household radiators. Besides these defects, it has reduced impact strength at low temperatures.

Therefore, prior art manufacturers of such articles as lamp bases have had the choice of producing ceramic and plaster articles or the like which are inexpensive but very fragile, or producing plastisol articles which have good impact and chip resistance at normal temperatures, but which are uneconomical, have "cold flow" and poor impact strength at low temperatures. The phenomenon of "cold flow" has also been called "heat distortion."

An object of this invention is to provide manufactured articles with improved properties and without the disadvantages of the prior art articles.

A further object is to provide a process for producing small and large seamless hollow objects of plastic with improved resistance to cold flow, chipping and breakage, and which is economically competitive with prior art processes and their products.

Other objects of this invention will become apparent from the description of this invention further below.

The articles of manufacture of this invention are rigid, are three-dimensional and are hollow. They comprise two components: (1) an outer layer component, also called "skin" herein and (2) an inner layer component, also called "flesh" or "rigidifier" here below. In most of the cases varying cross sections of a single article show varying measurements or shapes, indicating curved sidewalls and undercuts. In other cases, the cross sections may be identical, indicating box-shaped or cylindrical objects. As it will be seen, the fact that the manufactured articles of this invention are preferably hollow in the initial steps of their manufacture, does not exclude that their cavities may be filled to varying degrees with a reinforcing spine material.

The skin is preset in its shape by a molding operation. It is formed from a plastic material, which is preferably pliable and resilient. Depending on the plastic material selected to form the skin, the molding operations may vary, in order to utilize the most advantageous method for the selected plastic. The outer surface of the skin readily receives coloring materials for decorating the composite article. The inner walls of the skin define an internal cavity accessible through an opening in the skin. The inner layer component is in intimate contact with the inner walls of the preset skin and is in supporting relationship to the outer layer (skin). This inner layer acts as a rigidifier and rigidly maintains the outer layer (skin) in its preset shape. The inner layer is formed by a latex bound composition and is described in detail further below. The latex composition is applied in a liquid state and solidifies within the preset skin. Thus, the skin acts as a mold in which to form the rigidifying inner layer. Depending on the properties of the skin and the latex composition, the setting of the latter may be performed while the skin is in a second mold or die. This second mold or die would usually be a split mold and is used to prevent deformation of the skin during the casting and setting of the latex bound composition forming the inner layer. The latter acts as a structural rigid backing member. The use of a second mold is superfluous in most cases.

The outer layer or skin component of the composite article of manufacture of this invention has a preferred wall thickness of about $1/64$ of an inch to about $1/4$ of an inch. Expressed in thousandths of an inch, this corresponds to a range of from about 15.625 mils to about 250 mils. The lower figure may be rounded out to about $15\frac{1}{2}$ mils. The inner layer or rigidifier flesh component may have a wall thickness of equal to the thickness of the skin, or even be as low as one-half of the thickness of the skin. In most cases, the thickness of the inner layer is substantially greater than that of the skin. Comparative thicknesses vary with the skin and latex compound formulation utilized. For instance a comparatively more rigid skin may permit the application of a thinner layer of rigidifier than a more flexible type, while maintaining the rigidifier at the same composition. By varying the formulation of the latex composition, a tougher or more rigid inner layer would permit the use of a outer layer than a less tough or less rigid inner layer, while maintaining the composition of the skin constant.

In one of the embodiments of this invention the outer layer and inner layer jointly form a second cavity and a reinforcing spine may be applied as a third component in the entirety or in part of the second cavity. Such a spine assists the rigidifying action of the inner layer and toughens the composite article of manufacture.

SKIN PORTION

Plastisols illustrate an eminently suitable material to form the skin portion of the articles of manufacture of this invention. Plastisols are well described in the literature, as e.g. in Modern Plastics 26, 78 (April 1949) by Perrone and Neuwirth. They are dispersions of finely divided polyvinyl resin powders in liquid organic plasticizers. The resins contain predominantly polyvinyl chloride with or without some other polymerized monomer. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used. Dioctyl phthalate is an example. Dioctyl adipate is another example, which frequently is used in admixture with dioctyl phthalate. Polyester plasticizers are also well known. The plastisols usually contain a stabilizer and may contain pigment, if so desired. For convenience and to achieve brevity, a few publications may be referred to, which all deal with plastisols, their formulation and application methods: (a) Geon Resin 121 in Plastisol Compounding, Service Bulletin PR–4, revised October 1958, B. F. Goodrich Chemical Company, 24 pages. (b) The Vanderbilt News. vol. 26, No. 3, June 1960; R. T. Vanderbilt Company, Inc., page 12. (c) Modern Plastics Encyclopedia Issue for 1961, published in September 1960; Vinyl Polymers and Copolymers, pages 129 to 132; Plastisol Molding, pages 765 to 771. (d) Modern Plastics Encyclopedia 1965, issued (1964); Vinyl Polymers and Copolymers, page 271; Plastisol Molding, page 690.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leather-like homogeneous layer or skin.

With regard to temperatures required, these are well known in the art. They vary from composition to composition. They vary with time. There are, further, three types of temperatures involved: (1) oven temperature, (2) mold (die) temperature and (3) temperature of the plastisol. Gelation temperature may be accomplished by heating the oven from 150 to 600° F. and usually is between a plastisol temperature of 150 to 300° F. The necessary times vary with the temperature used. Fusion is accomplished by heating the gelled layer in ovens from about 350° F. to about 650° F. The achieved plastisol temperature for fusion should advantageously range from about 350° to 450° F.

The most useful molding methods for plastisol skins are illustrated by (a) slush molding, also called slush casting and (b) rotational molding, also called rotational casting. The expression "casting" is used because the plastisols are applied in fluid state and for this reason the operation has similarity to metallurgical casting. Seamless dies are preferred for the intermediate products of this invention. They can be readily utilized, even when complicated undercuts exist in the dies, as the skins produced from the plastisols are flexible, elastic and have a "shape memory," i.e., they recover from their stretched position, obtained during removal, to the original molded shape.

When slush molding or slush casting is used, in the first step an excess of plastisol may be poured into the seamless die. As the plastisol reaches gelation temperature, the layer adjacent to the metal wall of the mold gels, i.e., solidifies. The thickness of the gelled wall is determined by the duration of time the mold is exposed to the temperature of gelation. The excess plastisol is then removed by pouring off the liquid portion. Heating is then continued to complete the fusion and the molded skin is then removed or stripped from the mold. There are two methods known in slush molding: (i) One Pour Method, and (ii) Two Pour Method. Both are well known in the art and are applicable to make the skins of this invention from plastisols.

Rotational molding is another method of casting. The basic departure from slush molding is that, instead of an excess of the liquid plastisol, a premeasured quantity of the fluid is used when charging the mold. This eliminates the need for removing any excess. The charged fluid plastisol is then distributed evenly in the die by rotating the same on a rotational molding machine. After the plastisol is properly distributed, it is gelled by the application of heat and finally fused. The completed skin is then stripped and removed from the die.

Whereas casting by slush molding or rotational molding is preferred to form the skins from plastisols, other methods known in the art may also be followed to achieve the same purpose.

Objects made of plastisols frequently display the defect known as cold flow. Cold flow may be defined as the warpage or flow of material caused by its normal environmental temperature. Cold flow in plastics is analogous to the warping of a wax candle in a hot climate, and when a thermoplastic product is subjected to compression, tension or flexing, the cold flow characteristics become even more accentuated. When a condition of localized intensified heat, such as that to which lamp bases are often subjected, is superimposed on a stressed article, cold flow warpage becomes critical and often results in making further use of the article impossible. The application of a rigidifier in accordance with the present invention counteracts the cold flow characteristics of plastisol skins, or at least reduces them to commercially acceptable limits.

Polyolefins, such as polyethylene and polypropylene are other illustrative examples for the production of the skin portion of this invention. Polyethylene is made today of varying properties with the low pressure and high pressure polymerization processes. It is supplied with varying densities, molecular weights, flexibility and other characteristics. The types of polyethylene most suitable for this invention are pliable, flexible and show some degree of elasticity. Polyethylene is preferred in this invention over polypropylene since it is more easily formed into pliable and flexible skins. Polyethylene copolymers, such as ethylene-vinylacetate and ethylene-ethyl acrylate copolymers, offer improved flexibility and resilience. They are rubberlike and similar to elastomeric plastics. For the production of skins from polyethylene and polypropylene seamless dies are not satisfactory and two-piece dies are preferred, using blow molding or other methods. Polyallomers belong to this class of materials, as they are copolymers of ethylene and propylene.

The skin portion of the articles of manufacture of this invention may be formed of other materials such as vulcanized natural rubber or synthetic rubber. The skins may be formed according to known procedures of rubber technology. One of the methods useful in preparing skins from rubber is to use latex molding (latex casting) compounds, utilizing plaster of paris molds. The Vanderbilt News, vol. 27, No. 4, December 1961, page 72, deals with latex compounding which can be used to make skins for articles according to the present invention.

Other suitable plastic materials, which can form the outer layer skins of this invention are illustrated by methyl methacrylate polymer, ethyl cellulose, polycarbonates, polyurethane elastomers, flexible epoxy compounds, flexible polyesters, amongst others. Some illustrative examples are given below:

EXAMPLE A

Methyl methacrylate

All percentages in this example and in the specification are weight percentages. A mixture was prepared of 62.5% methyl methacrylate monomer, 0.6% benzoyl peroxide, 2.1% plastic white color paste concentrate, compatible with methyl methacrylate, 34.4% polymethylmethacrylate, Du Pont's Lucite "30," 0.5% dimethyl-p-toluidine, totaling 100%. The skins are prepared by casting into suitable molds. The composition of this example polymerizes at room temperature. Heating to 100–120° F. speeds up polymerization considerably. Latex molds can be used. Plaster and clay molds can be used, if coated with gelatine, or cellulose acetate or sodium silicate or tin foil. Casting was carried out in a latex mold in 3 subsequent coats and yielded a molded skin with fair flexibility and good surface. Plasticizers may be incorporated, if desired. Harflex 340 of Harchem Division, Wallace & Tiernan, Inc. is a suitable resinous-type, primary, non-migrating, saturated polyester plasticizer, compatible with methyl methacrylate monomer. The color paste is used to stain the skin. Its use is optional.

EXAMPLE B

Polycarbonate

Polycarbonates can be cast from organic solvent solutions. Polycarbonates dissolve, e.g. with ease in methylene chloride. A solution was prepared from Lexan No. 105 powder to form a solution of 83.3% polycarbonate in 16.7% methylene chloride, yielding 100% of the solution. As an example, this solution can be slush cast in latex molds, and air can be blown in to assist in volatilizing the solvent. The latex molds are standard in casting plaster of paris objects. The polycarbonate skin remains in the mold. It is very strong, flexible and durable, and can easily be stripped from the mold. To reduce the effect of shrinkage, fillers may be incorporated. A ratio of equal weights of filler to polycarbonate is an illustrative example. The resulting skin is still strong. Polycarbonate resins are marketed by General Electric under the Trademark of Lexan. They can also be blow molded and vacuum formed.

EXAMPLE C

Flexible epoxy resin

The proper composition has at least three ingredients. (1) a low molecular weight epoxy resin of the epichlorhydrinbisphenol A—condensation product type, like Shell Chemical's Epon 828. (Epon is a registered trademark of Shell); (2) low viscosity liquid aliphatic polyepoxides, like Epon resin 871, which imparts increased flexibility to Epon resin compositions; and (3) a curing agent, illustrated by diethylenetriamine and triethylenetriamine, respectively known as DTA and TETA. Other comparative items, known in the trade, may be replaced for the commercial products mentioned. Fillers may be present as additional ingredients. A suitable additive to regulate viscosity is a submicroscopic pyrogenic silica prepared in a hot gaseous environment, marketed by Cabot Corporation under the trade name of Cab-O-Sil. A satisfactory composition to obtain skins is 44.25% Epon resin 828, 44.25% Epon resin 871, 2.65% of Cab-O-Sil and 8.85% diethylenetriamine, totaling 100%. This composition sets at room temperature in about 5 hours and at 80° C. it sets in 2 hours. The composition may be varied according to principles known in the art. Skins can be prepared from latex molds or other elastomer molds. These are actually multi-pieced plaster of paris molds externally reinforcing an entirely separate flexible elastomer mold, having one opening for pouring in the composition to be molded and set. The rubber surface is coated with a parting agent and the epoxy composition is slush cast into the molds. The slit mold here described is used to mold skins showing undercuts. Other molds and molding methods can also be use, depending on the article to be manufactured. Epoxy plasticizers include epoxy compounds of fatty oils and their acids. Epoxy novolac resins and cycloaliphatic epoxies are other illustrative members of this group. Polyamids and acid anhydrides may also be used as curing agents.

EXAMPLE D

Flexible polyesters

Polyester resins are usually made in two steps. In the first step a condensation reaction is carried out between a dibasic acid and a diol and this is then blended with a monomer. Maleic anhydride and fumaric acid are examples of the dibasic acids. Other unsaturated acids could also be used, like itaconic. Phthalic anhydride and isophthalic acid may be part components of the acids, to secure desired modifications. The useful glycols form a long list known in the art. Propylene glycol, ethylene glycol, diethylene glycol and dipropylene glycol are illustrative examples. Neopentyl glycol is another example. Styrene is most frequently used as the crosslinking monomer. Vinyl toluene is another example. Laminac is a registered trademark of American Cyanamid. Laminac polyester resin EPX–126–3 is a flexible polyester resin containing styrene monomer. A composition was prepared from Laminac polyester resin EPX–126–3 92.6%, MEK peroxide 2.7%, cobalt naphthenate solution (6% Co) 0.27%, Laminac additive #10, 1.73% and Cab-O-Sil 2.7%, totaling 100%. MEK peroxide is methylethyl ketone peroxide. Laminac additive #10 is a petroleum wax composition dispersed in styrene, for ease of incorporation into polyesters. It improves surface characteristics. The peroxide is the crosslinking agent and the cobalt assists the crosslinking. Flexible polyesters usually contain long chain acids or glycols. The gel time at room temperature is about 10 minutes for this composition. The Cab-O-Sil assists in regulating the thickness of the deposit if slush casting is used for molding. Two or three coats can be slushed to obtain a desired skin thickness. The skin formation occurs at room temperature. More rigid polyesters can be blended with the flexible one used in this example, to vary properties. Latex molds and those utilized for epoxy resins, may be used with polyesters.

EXAMPLE E

Isocyanate elastomers (urethane elastomers)

Liquid urethane polymers, such as Du Pont's Adiprene L–100, can be transformed into tough, rubbery solids by reaction of the isocyanate group with polyamine or polyol compounds. In addition, some materials which do not contain active hydrogens, such as the titanate esters, appear to catalyze cross-linking. Adiprene L–100 can be cured with diamines, or moisture, or polyols, or by miscellaneous catalysts, such as lead or cobalt naphthenate, potassium acetate and titanate esters. Tetrabutyltitanate is an example of the esters. One of the popular polyamines is MOCA, which is 4,4'-methylene-bis-(2-chloroaniline). A formulation is illustrated by 100 parts of Adiprene L–100 and 12.5 parts of MOCA, which gives a MOCA percent-equivalent of 95. Parts are by weight. Conditions were: Mixing temperature: 212° F., cure temperature: 212° F., curing time: 3 hours. LD–420 is a different type of liquid urethane elastomer, which yields high quality vulcanizates when cured with MOCA. A respective formulation is illustrated by 100 weight parts of LD–420 (Du Pont) and 8.8 weight parts of MOCA. This is mixed and cured the same way as Adiprene L–100, for the same length of time. It is improved by aftercuring 1 week at 75° F. at 60% relative humidity. In making a skin rotational molding is recommended both for Adiprene L–100 and for LD–420. A silicone mold release is advantageously used to assist separation from the molds.

EXAMPLE F

Ethyl cellulose

Ethyl cellulose skins can be molded by vacuum forming and injection molding, amongst other methods. The same applies to cellulose acetate and cellulose acetobutyrate. Combination of casting and hot melt methods may also be used.

The preset molded outer layers (skins) can be prepared by various molding processes. The selected process depends on the selected plastic material and on the shape and size of the skin to be molded. For illustrative purposes a few examples are given. Casting such as slush casting or rotational casting: plastisol, flexible polyester, flexible epoxy resins, methyl methacrylate, polycarbonates from solution, rubber from latex, etc. Injection molding or extrusion: plastisol, polycarbonates, ethyl cellulose, polyethylene, cellulose acetate, cellulose acetobutyrate, etc. Vacuum forming: polyethylene, polycarbonates, polyallomers, etc. Blow molding: polycarbonates, polyethylene, polyallomers, ethyl cellulose, cellulose acetate, etc. Hot melt process: ethyl cellulose, plastisol or other plasticized polyvinyl chloride composition, polyethylene, etc.

Whether a one-piece, two-piece or multi-piece mold is required, depends on the selected skin material and, to some extent on the shape of the manufactured article. The molding process also influences the mold selection. Plastisol illustrates a skin forming material which permits the use of one-piece molds even if the skin has many undercuts in its shape. Methyl methacrylate illustrates a material which requires at least two-piece molds in most instances. Blow molding and vacuum forming are usually carried out in two-piece or multi-piece molds. One-piece molds form seamless molded shapes. Two-piece molds cause, in most cases, some seam formation. It may be necessary to eliminate these seams. Therefore, seamless molding is of advantage.

The expression that the skin materials are flexible, pliable and resilient is meant in a relative manner in comparison with the inner layer of the articles of manufacture, i.e. the flesh portions which are relatively rigid. The composite article itself is rigid and is resistant to breakage. The flesh portion rigidifies the flexible skins and improves resistance to cold flow or heat distortion. The skin materials protect the rigidifier flesh portion from fracture. This mutual improving effect between skin and flesh materials is unexpected and surprising and the effect obtained could be described as synergistic.

From the skin materials discussed above, polyethylene and polycarbonates, when blow molded, are used at a limited thickness. In using the various skin materials with the latex bonded filler inner layers of this invention, the composite article manufactured shows elimination of flexibility, improved resistance to impact and in many cases the tensile strength of the composite article shows improvement when compared separately to that of the skin or flesh material. The inner layer also contributes to the weight of the composite article. These observations apply to skins made of plastisols, flexible polyesters, flexible epoxy resins, polyethylene, polypropylene, polyallomers, polyurethane elastomers, rubber, polycarbonate, ethyl cellulose, methyl methacrylate, amongst others. The degree of the above discussed improvements may vary according to the selection of the skin forming material, its secondary compounding ingredients, thickness and shape of the skin, formulation of the flesh material and its thickness, amongst other factors.

In my parent applications, the specifically disclosed rigidifying flesh portion was plaster of paris and asphalt. The latex bonded filler flesh portion of this invention shows great improvement over the use of plaster of paris or asphalt. The advantages of the novel flesh portion over that disclosed in my parent applications could be summarized as follows: (i) Only in rare cases an interior reinforcing spine is required for the flesh layer. On the other hand, plaster of paris and asphalt require such reinforcement in many cases. According to this invention the spine portion, if applied, is mostly applied locally in selected positions. (ii) It has greatly increased strength and resistance to impact. (iii) In comparison with plaster of paris it requires much less water for application. The plaster of paris wet mix frequently contains about 50% water when applied. As illustrated by the examples below, the latex bonded filler composition requires much less water (14–15% is a proper illustration). This provides for much faster drying of the inner layer, faster production speed and, additionally, reduction in shrinkage during drying. (iv) In comparison with asphalt and the colloidal combination of asphalt, rubber and polyethylene, the application temperature is of importance. The former materials require elevated casting temperatures, whereas the latex bonded filler compositions can be applied at room temperature by slush casting. When elevated temperatures are used for casting and the skin is thermoplastic in nature, as plastisol skins are, the skin requires a second supporting two-piece mold to prevent deformation at the required casting temperatures of 200 to 250° F. In contrast thereto, the latex bonded compositions can be slush cast directly into the molded skin and the molded skin may act as the solely required mold. Only in rare cases, if the skin is very soft, pliable and resilient, would a second mold be of advantage in holding the shape of the molded skin while a rigidifier layer is placed behind the skin. The less flexible skins can be used as molds themselves. This is a surprising fact when considering the size and weight of an object like a planter or a garden ornament or a bird bath. Some of these may have a height of 3 or 4 feet.

FLESH PORTION

As described earlier, the flesh portion of the products of this invention forms the inner layer, which in turn is snugly attached to the outer layer and adheres thereto. One of the purposes of the inner layer is to rigidify the outer layer skin portion. The rigidifying action is of particular importance, where the outer layer skin is flexible, according to a favored embodiment of this invention. A further object of the inner layer is to provide "body" and possibly weight to the article of manufacture.

The inner layer is formed, according to this invention, from a composition comprising (a) a binder component, (b) a filler component, (c) water and in most instances (d) auxiliary materials, required to set the binder, or stabilize the composition or aid in dispersing the fillers.

(a) Binder component

The binders herein used are latices either of natural or of synthetic origin. A latex, as the term is herein used, is a water dispersion of an elastomer. Latices are normally considered as being emulsions. A narrower interpretation of the term "emulsion" describes it as a dispersion in water of a water immisicible liquid. However, in most cases, the dispersed phase of latices is a solid and therefore the dispersion could be considered a suspension. It is assumed that the rubber tree in fact emulsion-polymerizes the isoprene-type monomer. Most synthetic latices are prepared by emulsion polymerization of the monomer or monomer mixture. Other synthetic latices may represent aqueous dispersions of elastomers, which have been obtained by other polymerization means, prior to emulsification. For the reason that emulsion polymerization is the most frequent method of making synthetic latices and the solidification of the monomer particles may be accomplished at a later stage, the latices useful herein include emulsions, where the dispersed binder is still in the liquid state.

The role of the latex in this invention is to bind the fillers to form a solid layer and preferably and additionally to provide adhesion of the inner layer to the inner surface of the outer layer skins. During the binding process or formation of the inner layer, the water of the latex evaporates and the elastomer remains. While in latex form, the latex should have good wetting power for the fillers used in the formulation of the inner layer. Additional surface active agents can be added to increase the wetting power or to stabilize the latex in question.

It is of advantage to use in the process of this invention a latex with as low a water content as is practical. In other words, a more concentrated latex is of advantage, providing it maintains its filler wetting properties. As the water has to evaporate and prolonged exposure to elevated temperatures is not desirable with many of the thermoplastic skins, high latex solids are of advantage. Latex concentration methods are well known in the art. Centrifuging, careful evaporation of part of the water, creaming and electro-decantation are some of the methods used. Electro-decantation is a combination of electrophoresis and decantation. A practical level of latex solids may be illustrated by a range of from about 40% to about 65%. In some cases, lower or higher solid contents may also be used. Natural latex is available with a range of solids of from about 30% to about 75%.

The following is an illustrative list of latices useful in the preparation of the flesh portion or inner layer of the products of this invention:

Natural rubber latex, like centrifuged natural Hevea latex;
Gutta percha latex;
Balata latex;
Styrene-butadiene copolymer latices of varying monomer ratios;
Polyisoprene latex;
Neoprene latex;
Butadiene-acrylonitrile latices of varying monomer ratios;
Butyl rubber latex;
Polyvinyl chloride latices, plasticized either internally or by plasticizer emulsion addition;
Polyvinylidene chloride latex;
Vinyl chloride-acrylic copolymer latices;
Ethylene-propylene copolymer latex, emulsified as a cement, after polymerization is completed;
Acrylic copolymer latices made of various monomer mixtures, amongst others.

Examples of commercial latex products available and the names under which they are marketed, are as follows:

Centrifuged natural rubber latex: Unitex (Stein Hall). Polyisprene latex: Shell Isoprene Latex 700 (Shell chemical Company). Styrene-butadiene latex: Pliolite 5352 (Goodyear) with a 30:70 styrene to butadiene ratio and Polyco 2422 (Borden Chemical Co.) with a 90:10 styrene to butadiene ratio. Neoprene (polychloroprene) latices: Neoprene Latex 571 and Neoprene Latex 400 (Du Pont). Butadiene-acrylonitrile latices: Non-reactive copolymers: Hycar 1551 and 1561 (high acrylonitrile), Hycar 1562 (medium acrylonitrile) (Hycar is a registered trademark of B. F. Goodrich Chemical Company). Reactive terpolymers containing in addition to butadiene and acrylonitrile a small quantity of an acrylic acid in a copolymerized state: Hycar 1571 (high acrylonitrile) and Hycar 1572 (medium acrylonitrile). Polyvinyl chloride latices: Geon 151. (Geon is a registered trademark of B. F. Goodrich Chemical Company.) Polyvinyl chloride (P.V.C.) is not suitable as a binder as such and its latices have to be internally plasticized or mixed with a plasticizer emulsion or plasticizing elastomer latex. Latex plasticized polyvinyl chloride latex is illustrated by Geon 552 latex, which is an intermixture of a PVC latex and a latex of a butadiene-acrylonitrile copolymer. Geon 576 illustrates an internally plasticized PVC latex, produced by copolymerizing vinyl chloride with methyl acrylate. A plasticizer plasticized PVC latex is illustrated by a latex containing in its solid content 100 parts of a copolymer of 80 parts of vinyl chloride and 20 parts of methyl acrylate and, in addition to said 100 parts, 35 parts of dioctyl phthalate in an emulsified state. Polyvinylidene chloride latices are rarely made as homopolymers. Examples of internally plasticized terpolymers are: (1) copolymer of 46 parts of vinyl chloride, 27 parts of vinylidene chloride and 27 parts of methacrylic acid. (2) Copolymer of 46 parts of vinyl chloride, 27 parts of vinylidene chloride and 27 parts of methylhexyl acrylate. A product, which is an internally plasticized polyvinyl chloride and polyvinylidene chloride copolymer is Geon 450×167. Various other latices containing polyvinyl chloride or polyvinylidene chloride are Geon 351, Geon 652, Dow Latex 700 (Dow Chemical), Pliolite 300 (Goodyear). Polyvinyl acetate homopolymer is illustrated by Polyco 117-H (Borden Chemical Company).

The expression "acrylic polymer" is considered for the purposes of this invention as a generic term which includes acrylic copolymers, i.e. polymers made of more than one acrylic monomer. An acrylic monomer is an acrylic type acid, its derivatives and substitution products of the acid and its derivatives. The term "derivative" includes esters and nitriles.

The term "an acrylic type acid" is a polymerizable alpha-beta unsaturated monovinylidene carboxylic acid, such as acrylic acid, methacrylic acid, ethacrylic acid, alpha-chloroacrylic acid, cinnamic aid, atropic acid, crotonic acid. Preferred are acrylic and methacrylic acids. Halogen substituted acrylic acids are also advantageous.

The elastomers of this invention comprising an acrylic polymer are insoluble in water.

Examples of nitrile derivatives are: acrylonitrile and methacrylonitrile.

Examples of ester-forming alcohols are the following: alkyl alcohols, such as methyl, ethyl, n-propyl, iso-propyl, 2-methyl pentanol, 3,5,5-trimethylhexyl, tertiary butyl, octadecenyl alcohol. Substituted alkyl alcohols, such as chloroethyl, chlorobutyl, 2-methoxyethyl, 2-butoxyethyl, 2-nitro-2-methyl propyl, oxoalcohol of an isobutylene dimer, alkoxyethyl; alicyclic alcohols, such as cyclohexanol and methylcyclohexanol; aromatic alcohols, like phenols and araliphatic alcohols, like benzyl alcohol; heterocyclic alcohols, like furfuryl and tetrahydrofurfuryl alcohol. Preferred alcohols have 1 to 18 C atoms in their aliphatic chain and the most commonly used ones have no more than 8 C atoms.

Acrylic acid homopolymers do not belong to this class, as they are water soluble. Acrylic esters as homopolymers, or copolymerized alone, can not be crosslinked with ease. Acrylic nitriles as homopolymers yield products that are too tough. Binary copolymers of acrylic acids with acrylic nitriles and binary copolymers of acrylic acids with acrylic esters can be crosslinked. One of the good copolymers is at least ternary and contains acrylic esters, nitriles and acids copolymerized. The acrylic acids in copolymers run between 2% to 15% of the total copolymer. Nitriles do not exceed, if used 40% of the total, and 15 to 30% represents a satisfactory range. Acrylic ester content of the copolymers may go as high as 95 to 98%, if nitriles are absent. Where nitriles are present, the ester content may range from 40 to 80%. Elastomer content can be varied by intermixing the respective individual latices.

Prepolymerized elastomers may be emulsified in the presence or absence of organic water-immiscible solvents, to form latex-type binders. Royalene P-3520 is an emulsified cement, made by U.S. Rubber, from prepolymerized ethylene-propylene copolymer. Neoprene cements can also be emulsified.

So called carboxyl-modified copolymers can be crosslinked many times by the action of heat alone or by the addition of vulcanizing agents with or without application of heat. Hycar 1570×20 is a carboxy-modified butadiene/acrylonitrile latex suitable for coagulant dipping. It has high tensile strength, outstanding abrasion resistance and good oil and solvent resistance. Its acrylonitrile content is characterized as medium-high. Its stress-strain properties can be varied from those characteristic of a rubber elastomer to those typical of a polyurethane elastomer. It can be vulcanized by certain metal oxides or salts alone. Zinc oxide or sodium aluminate may be used as sole vulcanizing agent. A standard sulfur/zinc oxide/accelerator system may be used for vulcanization also. Zinc oxide levels and pH changes can vary its properties greatly Calcium nitrate in methanol solution is a recommended coagulant.

A carboxy-modified butadiene-styrene polymer is illustrated by Good-rite 2570×5. (Good-rite is a registered trademark of B. F. Goodrich Chemical Co.). It has the ability to cure by the application of heat alone. Heat crosslinking can be catalyzed by the addition of oxalic acid or ammonium chloride, permitting lower curing temperatures. Of course regular cures with conventional curing systems are also useful. A third curing system is zinc oxide or sodium aluminate. These act upon the carboxylic portion of the polymer. Sodium aluminate cures in 3 days at room temperature. Zinc oxide performs similarly in the presence or absence of sulfur.

A useful class of reactive acrylic copolymers is illustrated by Hycar 2671, Hycar 2600×92 and Hycar 2600×113. Hycar 2671 is anionic and yields, upon air-drying at room temperature, properties which are valuable for many applications. For curing, it requires temperatures of from about 300° to about 325° F. Acid salts, like diammonium acid phosphate and ammonium chloride, lower the curing temperature. Crosslinking agents can be utilized, like glyoxal, butylene glycol, triazine resins, melamine-acrylic resins, etc. It has good resistance to discoloration. Hycar 2600×92 is a modification of Hycar 2671 with improved resistance to discoloration by light and heat, otherwise having similar hardness or softness properties. It has greater modulus and less elongation than 2671 after 3 days room-temperature drying. Oxalic acid catalyzes its cures and lowers curing temperature. Zinc oxide is a favorable additive. Hycar 2600×113 is heat reactive and much softer than 2671 or 2600×92. A cure cycle of 3–7 minutes at 300° F. is suitable. Oxalic acid or ammonium chloride catalyzes the crosslinking and lowers the required temperature. It shows remarkable stability to multivalent ion salts, alcohols, solvents, etc. It can be cured at 212° F. in 3 minutes to acceptable strength. Hycar 2600×112 is a similar copolymer with film forming heat reactivity at as low as 150° F. It has increased hardness compared to 2671 and 2600×92. Hycar 2600×112 does not form films at room temperature and requires elevated temperatures for performance.

It will be realized that physical strength of the flesh portion will depend on the particular latex binder applied, presence or absence of crosslinking or curing and the filler combination used.

It is possible to vulcanize natural rubber particles in dispersed state, i.e. in latex form. Upon drying, such latex immediately forms strong vulcanized films. Such a latex was marketed under the trade name of Vultex with about 30–33% N.V. and in concentrated form under the trade name of Revultex with about 60–65% N.V. Such vulcanized or crosslinked elastomer latices are also useful in this invention.

(b) Filler component

The fillers of the flesh portion may be varied. Pigments, like titanium dioxide, lithopone, zinc sulfide, zinc oxide and others used in emulsion paint formulations may be used. Extender pigments and coarse fillers may also be used. Various types of clays or kaolins, calcium carbonate (natural or precipitated), such as whiting, and coarser materials, like flint ($SiO_2$) can be utilized. A 60 mesh silica illustrates the coarser materials. Talc and magnesium silicate, barium sulfate, colored pigments, like iron oxides, ochres, etc. may be used. Addition of small quantities of fibrous materials to the fillers may help to strengthen the inner layer portion of this invention. Asbestos fibers, short staple fiberglass may be mentioned as examples. The illustrative examples here below use a combination of whiting, McNamee clay and flint (silica) in a satisfactory proportion.

Other examples of fillers are: shell flour, carbon black, diatomaceous earth, aluminum hydroxide, hydrated alumina, bauxite powder, magnesium carbonate, dolomite powder (calcium-magnesium carbonate), mica, etc. For the coarse particle size component vitreous rock of igneous origin may be used. Portland cement forms with latices interesting compositions, while it binds part of its water content. With proper case, portland cement may be incorporated as part of the fillers.

Coarse fillers have greatly reduced surface area, compared with fine particle size fillers. Therefore, a coarse filler can be loaded into a latex mix in comparatively high proportion, without requiring additional binder content. The coarse fillers help to reduce the danger of cracking during drying and assist in decreasing shrinkage to a considerable extent.

When using clays as part of the filler, the soft clays, like McNamee clay, are more advantageous, than the hard clays, like Dixie clay.

To calculate surface area of pigments and fillers the following equation is used:

Total surfaces are $= 6W/Sd$ wherein $W$=weight, $S$=specific gravity and $d$=average diameter of particles in centimeters. This discussion relates to the pigments and fillers of Example 1. The Yorkshire Whiting has a surface area of 10,000 square centimeters per gram. The McNamee clay has a specific gravity of 2.5 and an average diameter of particles of 1.2 microns. These figures yield a surface area for the clay of 2,000 square centimeters per gram. The 60 mesh silica has an average particle diameter of 0.025 cm. and a specific gravity of 2.4. These figures yield a surface area for the silica of 100 square centimeters per gram. Table 1 shows the analysis of the figures, as obtained from Example 1, below.

TABLE 1

| Filler | Percent in— Dry weight | Percent in— Filler mix | Surface in sq. cm. in 1 gr. oi filler | Percent surface area of 1 gr. of filler |
|---|---|---|---|---|
| McNamee clay | 9.75 | 10.76 | 215.2 | 6.18 |
| Yorkshire whiting | 29.14 | 32.18 | 3,218.0 | 92.34 |
| 60 mesh silica | 51.68 | 57.06 | 51.7 | 1.48 |
| Total | 90.57 | 100.00 | 3,484.9 | 100.00 |

The above figures illustrate the importance of the percentage of the surface area a given filler occupies in the total surface area of all the fillers used in a particular formulation. The coarse filler (60 mesh silica) is 57.06% by weight of the total weight of the filler mixture, whereas it yields 1.48% of the total surface area of the fillers. In a proper formulation the filler surface area equals the area of the interface of the filler-latex solids composition. This explains why the coarse fillers reduce shrinkage and cracking during the drying of the inner layer.

(c) Auxiliary material component

The various latices have varying degrees of mechanical stability. Many of them require additional stabilization to secure resistance to shear in mixing operations and stability in storage in the presence of the fillers used. Latex stabilizers are one type of auxiliary material. Igepals are examples of latex stabilizers. They are alkylphenoxypoly (ethyleneoxy)-ethanols. Some are nonyl phenol condensation products with ethylene oxide. Igepal CA–630 is an example of latex stabilizers. Igepal is a registered trademark of Antara Division of General Aniline and Film Corp.

Surfaceactive agents may be added for pigment and filler dispersing purposes also. They might simultaneously act as latex stabilizers. Darvan 7 is an example of such agents and is a sodium salt of a polyelectrolyte maketed by R. T. Vanderbilt Co.

Vulcanizing agents and/or vulcanizing activators are exemplified by sulfur and zinc oxide. They are incorporated preferably as water dispersions into the latex compositions. Various crosslinking agents could be classified at this point and are mentioned elsewhere in this specification, designating where they may be advantageously used. They lower crosslinking temperature or accelerate the required duration.

Vulcanization accelerators are another group of possible auxiliary materials. A number of accelerators are mentioned, together with trade names of R. T. Vanderbilt Co., under which they are marketed, as follows: Dithiocarbamate type ultra accelerators: zinc dibutyldithiocarbamate (Butyl Zimate), aqueous solutions of sodium dibutyldithiocarbamate (Butyl Namate), aqueous solution of potassium dibutyldithio carbamate (Butyl Kamate), activated dithiocarbamate (Butyl Eight or Setsit 51). Thiuram type ultra accelerators: Tetraethylthiuram disulfide (Ethyl Tuads) and dipentamethylene thiuram tetrasulfide (Sulfads).

Ultra accelerators were selected for illustration, as low temperature or room temperature cures are of advantage in this invention.

Butyl Zimate yields fast cures with natural rubber, styrene-butadiene rubber (SBR), neoprene and nitrile latices. Ethyl Tuads and Butyl Namate or Kamate accelerate the cure of neoprene latices. Setsit-51 cures natural latex at room temperature and accelerates the cure of other elastomers. The thiuram ultra accelerators contain available sulfur and may be used in sulfur-free formulations, i.e. where all the vulcanizing sulfur is derived from the accelerator. Ethyl Tuads contains in cubes 10.8% and in rods 9.8% of available sulfur. Sulfads contains in powder form 25% and in rod form 22.5% available sulfur. Sulfads alone, without additional sulfur, is a vulcanizing agent for natural rubber, butadiene-styrene and butyl rubbers. It is a primary accelerator for butyl rubber and a secondary accelerator for most elastomers.

The auxiliary materials also include antioxidants. Examples with trade names, refer to products of R. T. Vanderbilt Co.: Agerite Spar is a styrenated phenol type antioxidant. Agerite Superlite is a mixture of polybutylated bisphenol A.

Another group of auxiliary agents of latex compositions is represented by softeners, such as plasticizers. These are incorporated as solutions or emulsions. They also may be added per se to emulsify into the latex composition during addition. Still another group is represented by thickeners, such as salts of polycarboxylic acids, casein, methylcellulose and carboxymethylcellulose salts. The proper thickener differs for the various types of latices.

PROPORTIONS AND RELATIONSHIPS PERTAINING TO THE FLESH PORTION

With regard to proportions, it should be understood that the requirements vary greatly depending on the outside or skin layer used, the type of end product manufactured, the latex utilized and the fillers selected. Therefore, the proportions and relationships mentioned herein are illustrations of the invention to assist in its understanding and are not intended as limitations thereof.

With the latter understanding, it is stated that the thickness of the inner layer or flesh portion ranges from about 10 mils to about 500 mils in most cases and in the plurality of practical applications its thickness is at least that of the outer layer or skin portion of the manufactured product.

For the discussion in this paragraph, the latex solids are considered as the elastomer content of the latex. This is the entire non-volatile portion of the latex. The latex solids may have a varying relationship to the fillers. A practical relationship is illustrated by a range from about 200 weight parts to about 2000 weight parts of filler for each 100 weight parts of the elastomer binder. In the illustrative examples below, the range is between 300 weight parts to about 1000 weight parts of filler per 100 weight parts of elastomer. The particle size of the fillers, i.e. their total surface area and the comparative flexibility and toughness of the used elastomer may require variations in the proper ratios. Generally speaking, the water containing flesh-forming mixes are highly loaded latex compositions, that is, they have comparatively high filler content.

As mentioned above, the coarse portion of the fillers has a distinct role in the process. It is advantageous that in the total filler component of the flesh-forming composition the coarse particle size fillers represent more than 50% of the total weight of the fillers. A practical useful range could be given as from about 40% to about 70% of the filler component. This range is based on the assumption that the coarse filler particle size is about 60 mesh. The proper proportions would change, should the relationship of the particle sizes (diameters) and surface areas of the "coarses" to the "fines" vary.

As the water content of the flesh-forming latex composition has to be evaporated during the manufacturing process, it is advantageous to have as low a water content as possible, or practical. The water content may be illustrated by a range of from about 10% to about 20% of the total weight of the composition. In some cases the water content may go up as high as 25% or more.

PREPARATION OF THE LATEX COMPOSITION AND PREPARATION OF THE INNER LAYER

In one embodiment of this invention the latex composition is prepared in 4 steps. In the first step in "Vat A" dispersing agents, water and the finer particle size fillers are mixed and the fillers dispersed. Some of the auxiliary components may be incorporated here. Examples of ingredients in the first step are McNamee clay (kaolin) and Yorkshire Whiting as fillers, water and Darvan 7 in 25% aqueous solution, as a dispersing agent. If sulfur is used for vulcanization, its water dispersion can be added here and the same applies to zinc oxide, where it is used as the vulcanizing agent or activator. Where alkaline stabilization is required, potassium hydroxide solution or ammonia can be added here too.

In the second step the latex portion is weighed out into "Vat B." Also latex stabilizers and additional dispersing agents may be added to Vat B as well as vulcanization accelerators and antioxidants. Potassium hydroxide or ammonia may be added here too, if such is advantageous for stabilization. Additives, which are soluble in water, are added as water solutions. Water-insoluble additives are preferably added as water dispersions.

In step three Vats A and B are mixed with each other. In a subsequent fourth step the coarse filler is added and mixed into the composition to complete its formulation. Suitable agitation is provided for each of the four steps. These four steps are given here for illustrative purposes. Variations are possible without necessarily changing the end results. Thickeners may be added, where desired or required, during any one of the four steps. A sixty mesh silica is an example of a coarse filler portion.

In production control, a standard sized panel of the skin forming material is dipped into the latex composition and the pick-up is established on a square inch basis. When the flow of this type of composition stops during draining, the balance is in a non-flowing somewhat gelled condition and can easily be weighed. If the pickup is too high, the composition is thinned with water. If it is too low, thickeners are added. A suitable thickener, if required, is Polyco 2896 of the Borden Chemical Co., which is a sodium polyacrylate. It is used in water solution. In many instances the dried first coat will pick up 1½ to 2½ times its own weight, to form the second coat. If a third dipping is made, the third coat is usually equal to the second coat in weight.

The dipping corresponds to the coat which remains in a premolded skin during the first, second and third slush-casting. The pickup per coat of slush casting is similar to that acquired by dipping of the test panel. As an illustration when a molded skin portion weighs 2 pounds, the first coat of slush casting provides about 1 pound of flesh portion from the latex composition. The second slush casting provides a pickup of 2 pounds and the third one provides another 2 pounds, bringing the total weight to 7 pounds. Triple slush casting of the flesh portion is usually the maximum required for proper thickness and/or rigidification. Slush casting may be carried out by hand pouring of the latex composition into the preformed skins. Rotational casting may be used also.

A suitable means for accelerating the drying of latex compositions to form the flesh portion is to blow air into the interior of the molded articles. Depending on air circulation, humidity, etc., the drying time for each coat may take 5 to 15 hours or more. Application of heat, vacuum or acceleration of exhaust, amongst others, may further accelerate the drying. In selecting temperatures one has to consider the possible thermoplastic nature of the skins used. If curing, crosslinking or vulcanization is contemplated, it can be carried out after the water has been evaporated from the inner layer of the manufactured products. Vulcanization at 250° F., for 15 to 20 minutes is given as an example for natural rubber bonded inner layers, providing primary and secondary accelerators and activators are present in proper combination.

At this point, it may be mentioned that when the latex bonded inner layer is in position behind the premolded skins and the inner layer is reasonably dry, the composite molded article in most cases can be exposed to vulcanization temperatures of about 250° F. without any deformation of the plastisol or other thermoplastic skins. In the absence of the inner layer and the simultaneous absence of a protective second mold, the premolded plastisol skins, for instance, may deform at as low a temperature as 120° F. The latex bonded inner layer holds the premolded skins in shape and permits vulcanization or curing at elevated temperatures without the application of protective second molds.

After the application of the inner layer is completed the manufactured products are ready for decoration. If trimming the products is planned, this is advantageously carried out prior to decoration.

In some instances, like in the case of bird bath displays for gardens and planters for flowers and plants, the inner layer is exposed to liquid water for prolonged periods. In such cases it is advantageous to additionally waterproof the inner layer. An example for waterproofing is the application, by slush casting, of a 2 component flexible epoxy coating. The latter may be loaded with fillers to the extent of 25–50% of the coating material solids.

Another problem may be encountered where large compressive forces are placed on narrow members of the manufactured products, like on neck portions of lamp bases. The tightening of sockets into such narrow necks may require the application of strong forces. A solution of such a problem is illustrated by first placing the tubing, through which the electrical wiring is led to the socket into the lamp base and then filling the narrow portion or neck portion of the lamp base with a rigid polyurethane foam forming composition. This composition solidifies where it is placed and causes a local additional reinforcement.

Changing the composition forming the inner layer with regard to fillers may decrease the adhesion to the premolded skins, like those made from plastisols. In such cases it may be advantageous to apply adhesive layers between the outer layer and inner layer of the manufactured products. Elastomer adhesives may be applied from solution, frequently also called rubber cements. I have found that the clay filler in combination with the latex binder brings about good adhesion in the formulation of the illustrative examples below.

ILLUSTRATIVE EXAMPLES OF THE INNER LAYER FORMING COMPOSITIONS

The examples given below are for the purpose of illustration and are not intended to limit this invention. Example 1 describes a natural rubber latex bonded inner layer forming composition, which will be the model for the comparative examples below.

EXAMPLE 1

Hevea latex

The following ingredients and proportions were used in Example 1:

| | Wet weight, percent | Dry content in wet weight, percent weight | Dry weight, percent |
|---|---|---|---|
| Part A: | | | |
| Water | 8.64 | | |
| 10% aqueous KOH solution | 0.53 | 0.05 | 0.06 |
| 60% aqueous zinc oxide dispersion | 0.26 | 0.16 | 0.19 |
| 25% aqueous Darvan 7 solution | 0.77 | 0.19 | 0.22 |
| 68% aqueous sulfur dispersion | 0.11 | 0.07 | 0.08 |
| McNamee Clay (kaolin) | 8.32 | 8.32 | 9.75 |
| Yorkshire Whiting | 24.87 | 24.87 | 29.14 |
| Subtotal for part A | 43.50 | 33.66 | 39.44 |
| Part B: | | | |
| Natural centrifuged latex, 62.5% N.V.[1] | 11.75 | 7.34 | 8.60 |
| 10% aqueous KOH solution | 0.36 | 0.04 | 0.05 |
| 25% aqueous Darvan 7 solution | 0.07 | 0.02 | 0.02 |
| 65% aqueous dispersion of Agerite Spar | 0.11 | 0.07 | 0.08 |
| Setsit 51 accelerator 100% | 0.11 | 0.11 | 0.13 |
| Subtotal for part B | 12.40 | 7.58 | 8.88 |
| Part C: Mix parts A+B=subtotal | 55.90 | 41.24 | 48.32 |
| Part D: Silica 60 mesh | 44.10 | 44.10 | 51.68 |
| Total | 100.00 | 85.34 | 100.00 |

[1] N.V.=Non-volatile content.

Parts A and B are first prepared separately and then they are mixed. Part D is added last.

The latex used in the example was Unitex, centrifuged natural Hevea latex of Stein-Hall. The dispersions of zinc oxide and sulfur are from R. T. Vanderbilt Co., marketed for latex compounding. Darvan 7 and Setsit 51 are also supplied by Vanderbilt as used. The water content of this composition is about 14.66%, of which 9.84% is in part A and 4.82% in part B, both based on total weight of the entire composition. Mixing procedure was as outlined further above. Based on latex solids the approximate percentage of sulfur is 1%, of zinc oxide about 2% and of the accelerator Setsit 51, about 1½%. The antioxidant is about 1% of the rubber solids. In this example the approximate weight proportions on a wet basis are: part A 43.5%, part B 12.4%, silica 44.1%, totaling 100%.

EXAMPLE 2

Isoprene elastomer latex

In this example the filler proportions used were similar to those used in Example 1. The elastomer was derived from Shell Isoprene Latex 700, which had 65.5% non-volatile content (N.V.). The elastomer content of the dry composition was 8.57% and of the wet composition 11.2%. The KOH content was similar to that of Example 1: the same applies to Darvan 7. However, both were added in their entirety to part A. Based on 100 elastomer solids about 1.6% zinc oxide dry, 1½ % Agerite Superlite, 1% Methyl Zimate, 2% Sulfads, all on a dry basis, were used, applied from water solutions or dispersions. The Agerite Superlite had 65%, the Sulfads 50%, the Methyl Zimate had 55% N.V. content, as used, to supply the given dry percentages. A small amount of thickener could be used in this case, as the viscosity was slightly lower than the optimum for slush casting. The resulting inner layer was softer than that made of Example 1 and being more flexible, may permit additional filler incorporation, to increase rigidity. The composition was free of added sulfur and the sulfur of vulcanization was derived from the Sulfads. The water content of this example was 14.32%. About 2.3% Igepal CO–630 was used in this example, based on 100 parts of elastomer solids, as latex stabilizer in part B. The composition could be used at room temperature or cured at elevated temperatures. Also sulfur could be usefully added.

EXAMPLE 3

Butadiene-acrylonitrile latex

In this example Hycar 1570 x 20 latex was used, which is a carboxy-modified butadiene/acrylonitrile latex having 43.4% N.V. The fillers were the same and in similar proportions as used in Example 1. The elastomer dry content in the composition was 8.68%. The additives on a dry basis per 100 elastomer parts were about: 3% zinc oxide, 1% sulfur, 1% Agerite Superlite, 1% Setsit 51, and 0.9% Ethyl Zimate. All additives were added from water dispersions or solutions, except Setsit 51, which incorporates with ease as 100% solids. No KOH was used in this example. The dispersing agent was Darvan 7, all of it present in part A. The water content of this composition was about 18.3%. A fraction of Borden Chemical Co's. Polyco 2896 thickener was used in this composition as an additive, as the mix was originally of slightly low viscosity. This composition should be slush cast in comparatively thin layers, to avoid cracking during drying. Strength was obtained at room temperature. When placed in an oven for 1 hour at 250° F. additional hardness developed. Addition of dioctyl phthalate plasticizer in the proportion of 10–20%, based on elastomer solids, improves flexibility and toughness of the inner layer obtained. The plasticizer is advantageously pre-emulsified.

EXAMPLE 4

Neoprene latex

The composition of the filler components and their proportions in the dry inner layer were the same as in Example 1. The latex used was Neoprene Latex 571, having 50% N.V., supplied by Du Pont. In 100 parts of dry inner layer the elastomer content was 8.44%. KOH was present in part A and in 100 parts of dry inner layer the dry KOH content was 0.11%. Darvan 7 was the dispersing agent and was part of part A as in Example 1. On a dry basis, the following additives were present for every 100 weight parts of elastomer solids: about 5 parts of zinc oxide, 2 parts of Neozone D special, 3 parts of Aquarex SMO, 1 part of Aquarex WAQ, 1 part of Tepidone and 0.5 part of Thiuram E. The ingredients were all added in aqueous dispersion or solution. Zinc oxide was incorporated in part A and was the vulcanizing agent. The remaining listed additives were incorporated in part B. Aquarex SMO is a surface conditioner and contains the sodium salt of sulfated methyl oleate; Aquarex WAQ is sodium lauryl sulfate; Tepidone is a 47% solution of sodium-dibutyl-dithiocarbamate in water; Thiuram E is tetraethylthiuram disulfide; Neozone D is phenyl-beta-naphthylamine. All the additives incorporated in part B are marketed by Du Pont. The water content was 17.4%. The preparation of this composition required care, as silica is not easy to disperse in neoprene latices. The latter require high alkalinity. Additional stabilization may be achieved with ammonium caseinate, containing dimethylamine. The resulting inner layer, after drying, was usable, but less attractive in its properties than the one obtained from Example 1.

EXAMPLE 5

Styrene-butadiene latex

The composition of the filler components and their proportions in the dry inner layer were, for practical purposes the same as in Example 1. The latex used was Pliolite 5352 of Goodyear, having 69% N.V. The monomer ratio of this latex is 30% styrene to 70% butadiene. A small quantity of KOH was used both in parts A and B. The additives on a dry basis, based on 100 parts of elastomer solids, were: about 2% zinc oxide, 1% sulfur, 1% Agerite Spar, 1½% Setsit 51. Darvan 7 was present both in parts A and B as a dispersing agent. The pH was kept between 8.5 and 10. The water content of the composition was about 13.34%. The composition deposited heavy layers in casting and gelled rapidly. It took longer to dry than the natural latex composition of Example 1. It was aftercured at 250° F. for a ½ hour. The cure at elevated temperature made the inner layer harder. The natural rubber latex formulation of Example 1 showed somewhat better adhesion to a plastisol formed skin and showed better strength properties than the product of this example, as formulated. An increase of the latex content of this composition seems to be indicated as advantageous.

EXAMPLE 6

Ethylene-propylene copolymer latex

In this example, part B contained Royalene P–3520 latex of U.S. Rubber Co. This is made from an ethylene-propylene copolymer elastomer converted first to a rubber cement and then emulsified. The latex as supplied, has 45% N.V. content. In the composition of this example no additives were added for the purposes of vulcanization, crosslinking or preservation from aging. Some additives are believed to be present in the original rubber cement. The filler content and the proportion of the 3 fillers was essentially similar to that applied in Example 1. Darvan 7 was used in part A for dispersing purposes. In the dry content of the composition the elastomer N.V. portion was 8.76% and the KOH content was about 0.11%. The KOH was incorporated into part A. The water content of the composition forming the inner layer in this example was 18.45%. The procedure for preparation of the composition was similar to that applied in Example 1. The pH was regulated to be between 10 and 11. Care had to be exercised in the step of adding the 60 Mesh Silica, to avoid coagulation. The resulting inner layer was usable, but showed less strength than the product of Example 1.

The Royalene type copolymers perform favorably with pigment and filler mixtures containing carbon black, calcined clays and Hi Sil. Sulfur cures Royalene, preferably in the presence of zinc oxide. The supplier recommends the use of dithiocarbamate type accelerators in the presence of stearic acid.

EXAMPLE 7

Carboxyl modified butadiene-styrene latex

The latex used in this example was Good-rite 2570×5 from Goodrich, which is a carboxylic modified butadiene-styrene polymer. It has the ability to cure by heat alone, or by the addition of zinc oxide or sodium aluminate, amongst others. It is shipped with about 42% N.V. In part B of this example the latex was applied alone to yield 8.73% elastomer content in the dry content of the composition. The fillers were about the same, as in Example 1 and the incorporation method was the same. Darvan 7 was used in part A as a dispersing agent. Zinc oxide dispersion was also present in part A to yield about 5% ZnO per 100 parts of elastomer solids. The composition mixed well and showed slightly lower viscosity than desired. This was corrected by adding a fraction of a percent of Borden's Thickener 2896, which is a sodium polyacrylate. For prestabilizing this latex 2% Igepal type stabilizer may be added to the wet latex, like Igepal CO–630. The resultant inner layer was hard and somewhat brittle. A 5 minute cure at 300° F. was applied. This latex type may be advantageously intermixed with natural rubber latex. The water content in this example was about 19.2%. This composition worked well at room temperature, when it was air blown dry and when applied in thinner layers. The formulation used zinc oxide alone as the crosslinking agent and had no sulfur present. This type of latex is film forming and cures at room temperature in 3 days time, when it contains 100 parts of elastomer solids: 5 parts of ZnO, 2 parts of sulfur, 2 parts of Setsit 5 accelerator and 2 parts of carbon black. The carbon black is optional.

EXAMPLE 8

Acrylic type latex

In the composition of this example the latex used was Hycar 2600×113, having 51.4% N.V. content. The properties of this latex have been described further above. It is a reactive acrylic latex, having carboxylic modification in the polymer. Its film cures upon heating and its cure can be catalyzed by oxalic acid or ammonium chloride. Its film is soft and flexible and can be used as plasticizer for other latices. In this example the latex was used as the sole constituent of part B, yielding 8.84% elastomer, based on the total dry content of the composition. The fillers were the same, having the same proportions and incorporated as described in Example 1. Darvan 7 was the dispersing agent in part A. No other additives were present, except the fillers. The ingredients mixed with ease and the composition could be applied with ease. Room temperature drying was applied. Heating the dry inner layer for 3–7 minutes to 250–300° F. further improved toughness.

This example was repeated with Hycar 2600×92, which is similar in nature to Hycar 2600×113, but is tougher. The N.V. content of the latex was 50.7%. The ingredients and composition of the dry content of the latex composition was the same as above. This alternative of the example yielded an inner layer deposit which was more rigid at room temperature drying. Heat cure is advantageous.

The water content of the composition with Hycar 2600×113 was about 16.3%. The inner layer formed by this composition was excellent in every respect. As shown, no crosslinking agent was applied, but such could be utilized.

EXAMPLE 9

Vinyl chloride-acrylic copolymer latex

In this example, Geon 450×23 latex was used, having 53.7% N.V. This type of latex is film forming at room temperature and does not require curing or crosslinking for ultimate performance. It has high pigment binding power and derives its toughness from the vinyl component and the heat and light stability from the acrylic component. Geon 450×23 is the softest of the corresponding series and has greatest filler loadability. It was used as the sole ingredient in part B of the composition, to yield 8.84% elastomer content in the total dry content. The fillers were the same, their proportions the same and their incorporation method the same as in Example 1. Darvan 7 was the dispersing agent applied in part A. No other additives were present as auxiliary agents. The preparation was made with ease and the viscosity, while a little on the low side, was usable without addition of thickener. It coated the molded plastisol skins well and upon room temperature drying gave an excellent quality inner layer. The dry ratio of Darvan to elastomer solids was 1.14 to 100 parts. This was a smaller ratio than in the other examples. The water content of the composition was about 15.7%.

EXAMPLE 10

Intermixes of high styrene SBR latex with hevea latex

In this example intermixes were prepared of a High Styrene SBR latex and the Hevea latex used in Example 1. As the High Styrene SBR latex, Polyco 2422 of the Borden Co. was used, which has a 90:10 styrene to butadiene ratio and has about 50% N.V. content. Three preparations were made, marked respectively (a), (b) and (c), as follows: In 10–a the total elastomer solids were kept about the same as in Example 1 and the elastomer solids of the intermix had about 20% High Styrene SBR latex solids and 80% Hevea latex solids (natural rubber). In 10–b the elastomer solids of the intermix had about equal parts of high styrene SBR latex solids and Hevea latex solids and the total elastomer solids in the dry content of the composition have been increased with about 84%. This was accomplished by roughly doubling the elastomer solids on the filler content. In practice additional SBR latex was added to the composition of Example 1, yielding additional latex solids equal to that previously present. In 10–c the elastomer solids of the intermix had about two parts of natural rubber latex solids to each single part of the high styrene SBR latex solids and the latex solids per filler content were tripled. This means that to the composition of Example 1 enough additional Hevea latex was added to double the natural rubber solids and additional high styrene SBR latex was also added to yield as much of its elastomer solids, as natural rubber latex elastomer solids were present in the composition of Example 1. The resulting compositions have been slush cast into molded skins and compared with each other both after air drying and low temperature curing. The inner layer obtained from Example 10–a was more brittle, than the one obtained from Example 1. It was still useful. The inner layer of 10–b was stronger and less brittle than the one of Example 1. The inner layer of 10–c was stronger and showed exceptional flexibility when compared with the one obtained from Example 1. In Table 2 following, some pertinent data are given in a comparative manner.

TABLE 2

| Example | Percent | | | |
|---|---|---|---|---|
| | 1 | 10-a | 10-b | 10-c |
| Total solids (N.V.) | 85.34 | 84.65 | 80.86 | 78.45 |
| Total water | 14.66 | 15.35 | 19.14 | 21.55 |
| Parts present, based on 100 parts of elastomer solids, of following: | | | | |
| KOH dry | 1.28 | 1.29 | 0.68 | 0.82 |
| Darvan 7, dry | 2.79 | 2.93 | 1.45 | 1.05 |
| ZnO, dry | 2.12 | 2.14 | 1.08 | 1.46 |
| Sulfur, dry | 0.93 | 1.02 | 0.57 | 0.87 |
| Setsit 51, dry | 1.51 | 1.47 | 0.76 | 1.00 |
| Agerite Spar, dry | 0.93 | 0.90 | 0.57 | 0.64 |
| McNamee Clay | 113.37 | 110.04 | 58.86 | 37.78 |
| Whiting | 338.84 | 328.10 | 169.83 | 112.94 |
| Silica 60 mesh | 600.93 | 582.39 | 300.75 | 199.23 |
| Total filler | 1,053.14 | 1,020.53 | 529.44 | 349.95 |
| Total fines [1] | 452.21 | 438.14 | 228.69 | 150.72 |

[1] The total fines equal the sum of the clay and whiting.

Some of the ingredients are based on the filler content, others on the vulcanizable elastomer solids, accounting for the specific figures listed. The high styrene SBR latex solids are not considered to be vulcanizable, because of the high styrene content. In 10–c and in 10–b the natural latex solids derived from the addition of part B of Example 1 and therefore a seeming irregularity exists on 100 elastomer basis for some of the ingredients.

The total filler content, based on total elastomer solids ranges from about 3.5 times in Example 10–c to about 10.5 times in Example 1. For formulation purposes the fine fillers, which are pigment size particles, are in a different category from the coarses. The fines cause increase in viscosity of the liquid composition as the loading is increased. At the time the coarses (part D) are incorporated, the viscosity of the liquid composition hardly shows any change. The fines pass through a 200 or 300 mesh screen and may be even finer. The coarses pass through a coarse mesh screen, illustrated by a 60 mesh screen. The surface area of the coarses is much smaller per weight unit than that of the fines. It is possible to produce satisfactory inner layer compositions with a smaller than 3½ times ratio of filler to elastomer solids, providing the fines predominate or are used exclusively. The role of the coarses in the latex compositions forming the inner layer of this invention is to promote drying speed, reduce danger of mud-cracking and lower the cost of the inner layer. Their presence improves the possibility of producing comparatively thicker layers per slush casting step. If the silica is increased in the formulation of Example 1 beyond the present proportion, the rigidification would be increased, but the impact resistance would be decreased. If the clay is increased and the whiting correspondingly decreased, the rigidity increases. The whiting improves resistance to shrinkage, as clays have high shrinkage. When the whiting is increased and the clay is decreased, the resulting inner layer is less rigid and is softer. In a proper formulation careful consideration should be given to the warpage.

The method of preparation of the illustrative examples of the compositions forming the inner layers can be varied. It was found convenient to follow the 4 step process outlined above, e.g., by incorporating the super-accelerators and sulfur and zinc oxides in different portions, storage stability of the individual portions can be achieved. However, if the storage stability is of no importance, or if the composition does not vulcanize or destabilize on standing, e.g. when the composition is used up fast, or where stable non-vulcanizing latex is used single full batches can be prepared in one step.

As mentioned further above, the proper viscosity of a latex composition suitable to form the inner layer can be established by dipping a pannel of the skin into the composition. A satisfactory viscosity is illustrated by a pickup of about 1.5 to about 1.6 grams per square inch. This type of composition will yield, by slush casting, a pickup of about 225 grams or ½ pound per square foot of skin area in the first coat. The second and third coats deposit about double of that obtained in the first coat. In a practical example, where 1 square foot of molded skin weighed 1.3 lbs., the first coat caused a pickup of 0.5 lb., and the second and third coat each deposited 1.0 additional lb., totaling a weight of 3.8 lbs. per square foot for the finished article. Of course, the shape of the article and exact formulation of the latex composition may alter the results. The weights given are for wet pickup. In this instance the wet inner layer's weight is about twice the weight of the molded skin outer layer.

Figure 1:
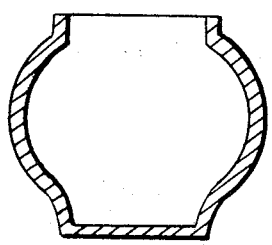
FIG. 1 is a vertical cross-sectional view of a single piece mold utilized in the present invention showing an undercut, 11 is the metal mold.
Figure 2:
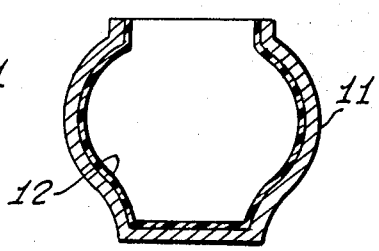
FIG. 2 is a vertical cross-sectional view of the mold of FIG. 1 in which a skin 12 was molded.
Figure 3:
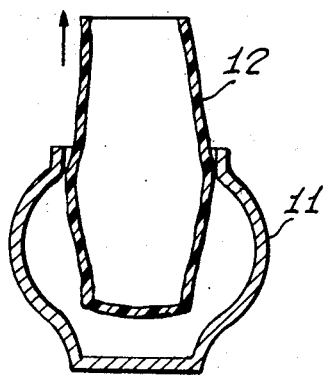
FIG. 3 is a vertical cross-sectional view of the mold of FIG. 1, illustrating the removal of the plastisol skin 12 from the mold. The skin is in a somewhat collapsed state, but regains its original shape after removal and cooling.
Figure 4:
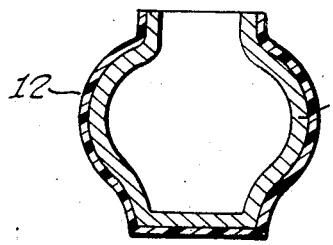

FIG. 4 is a vertical cross-sectional view of a composite article of manufacture. The skin 12 of this article was molded in the mold of FIG. 1 and the inner layer 13 is snugly attached to the said skin. The inner layer 13 is also called rigidifier or flesh portion in the description further above.

Figure 5:
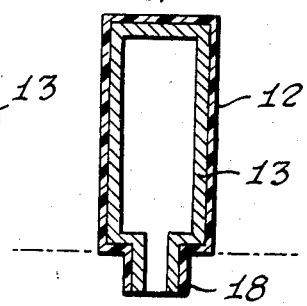

FIG. 5 is a vertical cross-sectional view of a composite article of manufacture having a cylindrical shape. This article has no undercuts. 12 is the outer layer or skin portion and 13 is the inner layer or flesh portion. 18 is the extension to be removed by trimming. This extension facilitates the manufacturing of the article.

Figure 6:
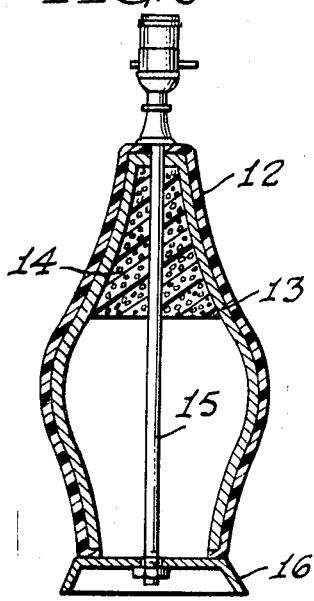

FIG. 6 is a vertical cross-sectional view of a lamp. 12 is the skin; 13 is the latex bonded inner layer; 14 is a rigid urethane foam layer; 15 is a metal tube to lead the electrical wiring to the socket, and 16 is a separate base for the lamp. The rigid polyurethane foam 14 acts as a secondary reinforcing support, applied discontinuously, in the local position where the reinforcing action is required. The lamp base 16 may be of metal or wood or a plastic material. Instead of metal tubing, the tubing of 15 may be of other suitable material, like a plastic. The rigid polyurethane foam acts as a reinforcing spine.

Figure 7:
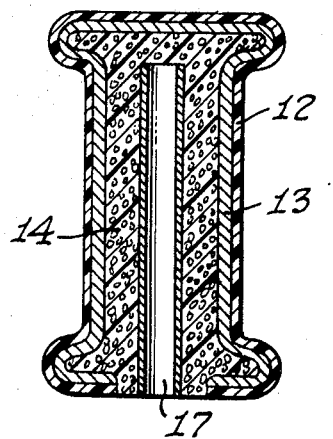

FIG. 7 is a vertical cross-sectional view of an ornamental base to support heavy loads. It can be utilized indoors or in gardens. 12 is the outer layer; 13 is the latex bonded inner layer; 14 is a rigid polyurethane foam layer, and 17 is a paper tube to act as an additional reinforcing spine. The upper end of the tube is sealed.

Figure 8:
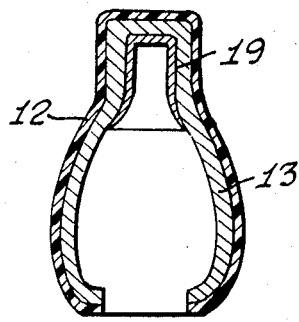

FIG. 8 is a vertical cross-sectional view of a hollow article of manufacture. 12 is the outer layer or skin; 13 is the inner layer or flesh portion and 19 is a reinforcing spine of metal utilized to strengthen the narrow neck portion of the manufactured article.

Figure 9:
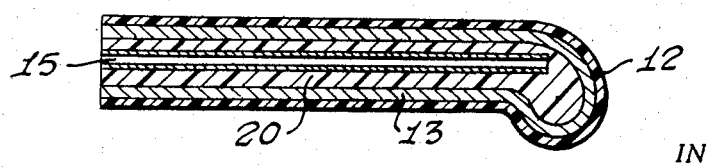

FIG. 9 is a vertical cross-sectional view of an arm rest piece for furniture. 12 is the skin or outside layer; 13 is the rigidifying inner layer; 15 is a metal tube acting as a reinforcing spine and 20 is a filled polyester layer acting in a similar manner to the rigid polyurethane foam in FIG. 6 and FIG. 7.

It may be stated that the spine layers 14 in FIG. 7 and 20 in FIG. 9 are distributed on a comparatively larger area of the cavity in view of the unusual stresses to which the respective composite articles are exposed during their use.

FIG. 10 is a schematic flow sheet.

The composite articles of manufacture of this invention comprise latex bonded fillers as the inner layer. The properties of this inner layer exclude, in most cases, the need for reinforcing spines. In some rare cases, such spines are of advantage in reinforcing local areas of the composite articles. FIGS. 6 and 8 illustrate such cases. The spine portion may be cast or placed behind the latex bonded inner layers. Metal may be applied by casting. The lower the melting point of the metal the less problems arise during casting. In many instances, metals with melting points of around 700° F. may be successfully cast into cavities formed jointly by the skin and inner layer. This can be explained by the cooling action of the skin-inner layer system on the cast thin metal layer required.

An illustrative flow diagram of one of the suitable processes of this invention is shown in FIG. 10, as follows:

Step 1

Casting fluid plastisol in a seamless die;
Alternative (a): by slush casting,
Alternative (b): by rotational casting (molding);

Step 2

Heating the plastisol to a sufficient temperature and for a sufficient time to cause gelation of the plastisol adjacent to the die;
In Alternative (a) pouring off the excess liquid plastisol;

Step 3

Heating the die and gelled plastisol to a temperature and for a time sufficient to fuse the gelled plastisol to a tough skin;

Step 4

Stripping the skin from the die:
Alternative (i) at room temperature,
Alternative (ii) at suitable elevated temperature;

Step 5

Slush casting a filler containing liquid latex composition behind the skin to form an inner layer;
Alternative (1): after first placing the skin into a two-piece second die, having the same shape as the first die.
Alternative (2): using the molded skin itself to form the inner layer behind it;

Step 6

Drying the composition forming the inner layer;

Step 7

(Elective alternative): Providing for a reinforcing spine in the jointly formed cavity of the skin and inner layer materials;

Step 8

Recovering the composite article of manufacture so formed.

In rotational molding no excess of plastisol has to be poured off. Gelation temperatures may vary, depending on the composition of the plastisol, duration of heat and whether the temperature of the oven or of the die or of the plastisol are taken. Gelation can be achieved satisfactorily at plastisol temperatures of 150° to 300° F. or at oven temperatures of 150° to 600° F., providing the duration of heating is properly adjusted. Fusion can be achieved between 350° and 650° F., depending on other factors, such as duration. Normally, plastisol temperatures of 350° to 450° F. yield satisfactory results.

Examples of the spine are metal and rigid polyurethane foam. When spines are used, they are mostly used for local reinforcement in selected portions of the composite articles of manufacture.

Slush casting of the plastisol can be carried out with the so called One Pour Method or the Two Pour Method. In the slush casting of the inner layer frequently the "casting-drying" cycle is repeated more than twice.

The filler-containing latex composition may also be applied by spraying. This may be advantageous e.g. to articles with rather open shapes. The spray gun is advantageously introduced through the access opening into the cavity of the premolded skin. In very open shapes the interior may be reached by the spray gun from a position outside the cavity. For viscous latex compositions airless spray equipment is advantageous. For less viscous materials equipment with air atomization may also be used.

If elevated temperatures are used in stripping the plastisol skin from the die, a temperature of 140° F. illustrates a suitable temperature.

The drying of the cast filler-containing liquid latex composition, to form the dry inner layer, can be carried out at room temperature or at somewhat elevated temperatures. A stream of air led into the individual cavities of the hollow articles promotes drying.

The two-piece die used in Step 5, alternative (1), may conveniently be a multi-piece die comprising more than two pieces.

The above-described flow sheet is to be appropriately modified if another skin forming plastic is used than plastisol, providing the selected plastic is not suitable for slush casting or rotational molding. The applicable molding methods for each plastic are well known in the art and are illustrated in the description further above.

An advantageous top limit in the inner layer is, for instance, 1500 parts of filler for each 100 parts of elastomer solids. In such cases the coarses exceed 50% of the total weight of the fillers.

Among the advantages of the present invention are that the resulting articles of manufacture have a high impact and chip resistance; are free of heat distortion in practical applications; are inexpensive to manufacture and may be readily mass-produced by the process of the instant invention.

It is apparent that the described examples are capable of many variations and modifications within the scope of the instant invention. All such variations and modifications are to be included within the scope of this invention.

I claim:

1. The process of producing a rigid hollow composite article of manufacture comprising a flexible outer layer component and a rigid inner layer component, comprising the steps of
   (1) casting plastisol in a seamless die to form a plastisol layer,
   (2) heating the plastisol to gelation temperature,
   (3) fusing the plastisol layer so cast to form a tough premolded skin as the outer layer component,
   (4) stripping the premolded skin from the die,
   (5) preparing in a separate step a filler-containing latex composition suitable to form said rigid inner layer component,
   (6) casting the latex composition said composition containing at least about 200 weight parts of filler for each 100 weight parts of elastomer solids, on the interior wall of the premolded hollow skin in a manner that the inner layer component is engaged with the entire extent of the inner wall of the premolded outer layer component and that the said inner layer forms a second cavity substantially of the same shape as the cavity of the premolded hollow skin,
   (7) drying the inner layer, and
   (8) recovering the composite article of manufacture.

2. The process of claim 1, wherein the outer layer component of (3) has a wall thickness of from about 15.5 mils to about 250 mils.

3. The process of claim 1, wherein the casting step (1) is carried out by slush casting and any excess of plastisol is poured off prior to the fusion step (3).

4. The process of claim 1, wherein the casting step (1) is carried out by rotational casting.

5. The process of claim 1, wherein the stripping of plastisol skin from the seamless die is carried out at an elevated temperature.

6. The process of claim 1, wherein step (6) is carried out with the stripped skin being the sole mold used to form the said inner layer.

7. The process of producing a rigid hollow composite article of manufacturing comprising a flexible outer layer component and a rigid inner layer component, comprising the steps of
   (1) preparing a premolded hollow skin as the outer layer component from a pliable plastic material,
   (2) preparing in a separate step a filler containing latex composition suitable to form said rigid inner layer component, said composition containing at least about 200 weight parts of filler for each 100 weight parts of elastomer solids,
   (3) applying the latex composition to the interior surface of the premolded hollow skin in a manner that the inner layer component is engaged with the entire extent of the inner wall of the premolded outer layer component and that the said inner layer forms a second cavity substantially of the same shape as the cavity of the premolded hollow skin,
   (4) drying the inner layer,
   (5) introducing into the cavity of the hollow composite article a rigid polyurethane foam forming composition, then causing said polyurethane composition to foam, thereby forming a reinforcing spine and filling at least in part the cavity jointly formed by the outer layer component and the rigid inner layer component, and
   (6) recovering the composite article of manufacture.

8. The process of claim 1, wherein the drying of the filler-containing latex composition is accelerated by blowing air into the cavity of the hollow article of manufacture.

9. The process of claim 1, wherein in step (6) the application of the latex composition is carried out by spraying.

References Cited

UNITED STATES PATENTS

| | | | |
|---|---|---|---|
| 1,998,897 | 4/1935 | Kay | 264—310 |
| 3,198,864 | 5/1965 | Bingham | 264—250 |
| 2,939,180 | 6/1960 | Hickler et al. | 264—302 |
| 2,974,373 | 3/1961 | Streed et al. | 161—Pour. Bik |
| 3,071,817 | 1/1963 | Laporte | 264—302 |
| 2,820,718 | 1/1958 | Fram et al. | 264—302 |
| 2,424,869 | 7/1947 | Wedger | 264—244 |
| 3,405,026 | 10/1968 | Roberts | 264—45 |
| 3,420,729 | 1/1969 | Roberts | 264—302 |

ROBERT F. WHITE, Primary Examiner

R. H. SHEAR, Assistant Examiner

U.S. Cl. X.R.

264—250, 302